(12) United States Patent
Han

(10) Patent No.: US 7,411,907 B2
(45) Date of Patent: Aug. 12, 2008

(54) METHOD AND APPARATUS FOR CONTROLLING PACKET FLOW FOR CORRESPONDING BANDWIDTHS OF PORTS

(75) Inventor: Kyu-Wook Han, Seoul (KR)

(73) Assignee: Samsung Electronics Co., L.T.D., Gyeonggi-Do (KR)

( * ) Notice: Subject to any disclaimer, the term of this patent is extended or adjusted under 35 U.S.C. 154(b) by 742 days.

(21) Appl. No.: 10/857,934

(22) Filed: Jun. 2, 2004

(65) Prior Publication Data
US 2004/0264493 A1   Dec. 30, 2004

(30) Foreign Application Priority Data
Jun. 30, 2003   (KR) .................. 10-2003-0043880

(51) Int. Cl.
*H04L 12/26* (2006.01)
(52) U.S. Cl. ...................................... 370/232; 370/412
(58) Field of Classification Search ......... 370/229–235, 370/252, 253, 412
See application file for complete search history.

(56) References Cited

U.S. PATENT DOCUMENTS

| | | | |
|---|---|---|---|
| 5,602,829 A * | 2/1997 | Nie et al. ................... 370/235 |
| 6,014,385 A | 1/2000 | Ayanoglu et al. | |
| 6,108,306 A | 8/2000 | Kalkunte et al. | |
| 6,618,357 B1 * | 9/2003 | Geyer et al. ............. 370/236 |
| 6,625,147 B1 * | 9/2003 | Yokoyama et al. ...... 370/389 |
| 6,661,803 B1 * | 12/2003 | Choi et al. .............. 370/413 |
| 6,680,908 B1 * | 1/2004 | Gibson et al. ........... 370/229 |
| 6,870,811 B2 * | 3/2005 | Barker et al. ............ 370/235 |
| 7,035,255 B2 * | 4/2006 | Tzeng ..................... 370/389 |
| 2001/0043566 A1 * | 11/2001 | Chow ...................... 370/235 |
| 2002/0126710 A1 | 9/2002 | Bergenwall et al. | |
| 2002/0150049 A1 * | 10/2002 | Collier et al. ........... 370/236 |

FOREIGN PATENT DOCUMENTS

KR   10-2002-0001403   1/2002

* cited by examiner

*Primary Examiner*—Ricky Ngo
*Assistant Examiner*—Gary Mui
(74) *Attorney, Agent, or Firm*—Harness, Dickey & Pierce, P.L.C.

(57) ABSTRACT

An apparatus and method for controlling a packet flow according to the bandwidth of corresponding ports, including a plurality of ports configured to compare a first packet number and a second packet number, and generate a packet flow control signal based on the comparison result, the packet flow control signal being used to control the packet flow.

53 Claims, 8 Drawing Sheets

METHOD AND APPARATUS FOR CONTROLLING PACKET FLOW FOR CORRESPONDING BANDWIDTHS OF PORTS

CROSS-REFERENCE TO RELATED APPLICATIONS

This application claims priority from Korean Patent Application No. 2003-43880, filed on Jun. 30, 2003, the contents of which are incorporated herein by reference in its entirety.

BACKGROUND OF THE INVENTION

1. Field of the Invention

The present invention relates to a method and apparatus for controlling a packet flow in accordance with corresponding port bandwidths.

2. Description of the Related Art

Internet Service Providers (ISPs) have attempted to assign individual bandwidths for different information types. An Ethernet switch is an exemplary device which may have the function of controlling bandwidth. However, the Ethernet switch may not control the bandwidth most effectively, for example an Ethernet switch may only operate with fixed bandwidth. Therefore, the Ethernet switch may not be able to satisfy the various bandwidth requirements of different users. For example, the Ethernet switch may be a 10 Mbps Ethernet switch, even though a user may only require 5 Mbps of bandwidth the user only have the option to use 10 Mbps of bandwidth due to the fixed bandwidth of the Ethernet switch. Therefore the ISP might waste 5 Mbps bandwidth that could be used by another user. The Ethernet switch may calculate bandwidth as a bit rate (bits/sec), i.e. the bits of the packet(s) transmitted/received per second. The Ethernet switch may sometimes transmit/receive packets above a predetermined bit rate of 10 Mbps. Therefore, a large counter may be required for calculating the bits/sec, and additionally a divider may be required for dividing the bits by a second so as to obtain the bit rate in bits/sec. As a result, the hardware size of the Ethernet switch is increased. In addition, because the divider may be used, it may be difficult to process a remainder of the calculations from the division operation of the divider.

SUMMARY OF THE INVENTION

An exemplary embodiment of the present invention is directed to controlling a packet flow in accordance with the bandwidths of a corresponding plurality of ports, including accumulating packets transmitted from a first port of the plurality of ports for a specific time interval, counting a length of the accumulated packets in units of M, where M is an integer 64, for calculating a first packet number, calculating a second packet number corresponding to a first bandwidth assigned to a second port, comparing the first packet number with the second packet number, and generating a packet flow control signal based on the comparison result.

Exemplary embodiments of the present invention may include monitoring a condition of a packet memory, generating information representing the condition of the packet memory, and storing the transmitted packets in the packet memory using the information representing the condition of the packet memory.

Exemplary embodiments of the present invention may include generating a look-up table using the transmitted packets. The look-up table may include a source address, a destination address and a medium access control (MAC) address. The first packet number may be equal to (a third packet number+a fourth packet number), where the third packet number corresponds to a length of previously accumulated packets, and the fourth packet number corresponds to a length of a present packet. The first packet number may be equal to (the third packet number+the fourth packet number+1) when (a first remainder+a second remainder) is greater than 64 bytes, and the first remainder corresponds to a remainder of (total bytes of the previously accumulated packets÷the length of previously accumulated packets), and the second remainder corresponds to a remainder of (total bytes of the present packet÷the length of the present packet), and where the first and second remainders may be expressed in units of bytes.

The packet flow control signal may control the flow of packets, and may correspond to a back pressure packet for a half duplex communication mode, or the packet flow control signal may correspond to a pause packet for a full duplex communication mode.

1. Another exemplary embodiment of the present invention is directed to a method of controlling a packet flow in accordance with bandwidths of a corresponding plurality of ports including, generating a look-up table based on packets received from a first port, monitoring a condition of a packet memory, generating packet transmission information based on information in the look-up table, generating information representing the condition of the packet memory, reading packets from the packet memory using the look-up table information, where the packet transmission information and the information representing the condition of the packet memory, counting a length of the packets read in units of M bytes to calculate a first packet number, where M is an integer, and M 64, calculating a second packet number corresponding to a bandwidth assigned to a second port, comparing the first packet number with the second packet number, and generating a packet flow control signal based on the comparison result.

Another exemplary embodiment of the present invention is an apparatus for controlling a packet flow in accordance with the bandwidths of ports, including a plurality of port controllers configured to receive a first set of packets and compare a first packet number with a second packet number and generate a packet flow control signal based on the comparison result, where the first packet number is calculated in units of M bytes, M being an integer 64, a packet memory configured to store the first set of packets, a look-up section configured to receive the first set of packets from the plurality of port controllers and generate a look-up table containing source address and destination address information from the first set of packets, a queue manager configured to monitor a condition of the packet memory and generate packet transmission information based on the look-up table, and transmit information representing the condition of the packet memory to the port controllers.

Exemplary embodiments of the present invention may include port controllers, configured to write the first set of packets in the packet memory, and read the second set of packets from the packet memory.

Exemplary embodiments of the present invention may include a first packet number that is equal to (a third packet number+a fourth packet number), where the third packet number corresponds to a length of previously accumulated packets, and the fourth packet number corresponds to a length of a present packet.

Exemplary embodiments of the present invention may further include a first packet number that is equal to a (the third packet number+the fourth packet number+1), when (a first remainder+a second remainder) is greater than 64 bytes, where the first remainder corresponds to a remainder of the (total bytes of the previously accumulated packets÷the length of previously accumulated packets), and the second remainder corresponds to a remainder of the (total bytes of the present packet÷the length of the present packet), and where the first and second remainders are expressed in units of bytes.

Exemplary embodiments of the present invention may include a packet controller configured to transmit the second set of packets, and receive the first set of packets, and a flow controller that is configured to control the packet flow of the first and second set of packets.

Exemplary embodiments of the present invention may include a flow controller including a bandwidth calculator configured to calculate the first packet number and the second packet number, a comparator configured to compare the first packet number with the second packet number, and a flow control signal generator configured to generate the packet flow control signal.

Exemplary embodiments of the present invention may include a bandwidth calculator including a transmission/receipt bandwidth calculator that is configured to calculate the first packet number, and a port bandwidth calculator that is configured to calculate the second packet number.

Exemplary embodiments of the present invention may include a flow control signal generator including a receipt flow control signal generator configured to generate the packet flow control signal corresponding to a first set of packets, and a transmission flow control signal generator configured to generate the packet flow control signal corresponding to a second set of packets.

Exemplary embodiments of the present invention may include the queue manager including a packet memory controller configured to monitor the packet memory, and control the condition of the packet memory, and a queue memory configured to generate the packet transmission information based on the look-up table.

Exemplary embodiments of the present invention may include a physical layer which receives the first and second sets of packets, and converts a signal corresponding to the first set of packets into a digital signal, and converts another signal corresponding to the second set of packets into an analog signal; and a medium access control (MAC) which transmits the digital signal to at least one of the port controllers, and controls the packet flow of the first and second set of packets.

Exemplary embodiments of the present invention may include a packet flow control signal and a transmission rate control operation that is performed when the second set of packets are provided from the packet memory.

Exemplary embodiments of the present invention may include a packet flow control signal that corresponds to a back pressure packet for a half duplex communication, and a pause packet for a full duplex communication.

Another exemplary embodiment includes an Ethernet switch which contains a plurality of port controllers configured to receive a first set of packets and compare a first packet number with a second packet number, and generate a packet flow control signal based on the comparison result, where the first packet number is calculated in units of M bytes, M being an integer 64, a packet memory that is configured to store the first set of packets, a look-up section that is configured to receive the first set of packets from the plurality of port controllers and generate a look-up table containing source address, destination address, and medium access control (MAC) address information based on the first set of packets, and a queue manager that is configured to monitor a condition of the packet memory, and generate packet transmission information based on the look-up table, and transmit information representing the condition of the packet memory to the plurality of port controllers.

Exemplary embodiments of the present invention may include a plurality of port controllers configured to write the first set of packets in the packet memory, and read the second set of packets from the packet memory.

Exemplary embodiments of the present invention may include a second packet number that is proportional to at least another second packet number of another of the plurality of ports.

Another exemplary embodiment of the present invention includes a flow controller including a bandwidth calculator configured to count at least one set of packets and calculate at least a first packet number, a comparator configured to compare the first packet number with a second packet number, and a flow control signal generator which receives the comparison result of the comparator and generates a packet flow control signal corresponding to the comparison result.

Another exemplary embodiment of the present invention may include a bandwidth calculator including a transmission receipt bandwidth calculator, which calculates a first packet number corresponding to a length of a set of packets, and a port bandwidth calculator, which calculates a second packet number corresponding to a bandwidth assigned to at least one port.

Exemplary embodiments of the present invention may include a port controller configured to receive a first set of packets and compare the first packet number with the second packet number and generate a packet flow control signal based on the comparison result, where the first packet number is calculated in units of M bytes, M being an integer 64.

Exemplary embodiments of the present invention may include a comparator configured to compare the first packet number with the second packet number, and a flow control signal generator configured to generate a packet flow control signal.

Exemplary embodiments of the present invention may include a packet memory configured to store the first set of packets, and a look-up section that is configured to receive the first set of packets from the at least one port controller and generate a look-up table containing source address and destination address information from the first set of packets, a queue manager configured to monitor a condition of the packet memory and generate packet transmission information based on the look-up table, and transmit information representing the condition of the packet memory to the at least one port controller.

Another exemplary embodiment of the present invention may include a flow control signal generator including a transmission flow control signal generator, which generates a packet flow control signal when a first packet number is greater than a second packet number, and a receipt flow control signal generator, which generates a pseudo packet to prevent packets from being transmitted if the first packet number is greater than the second packet number.

Exemplary embodiments of the present invention may include a bandwidth calculator including a transmission receipt bandwidth calculator, which calculates a first packet number corresponding to a length of a set of packets, and a port bandwidth calculator which calculates a second packet number corresponding to a bandwidth assigned to at least one port.

Exemplary embodiments of the present invention may include at least one port controller configured to receive a first set of packets and compare the first packet number with the second packet number and generate a packet flow control signal based on the comparison result, where the first packet number is calculated in units of M bytes, M being an integer 64.

Exemplary embodiments of the present invention may include a comparator configured to compare the first packet number with the second packet number, and a flow control signal generator configured to generate a packet flow control signal.

Exemplary embodiments of the present invention may include a packet memory configured to store the first set of packets, a look-up section that is configured to receive the first set of packets from the at least one port controller and generate a look-up table containing source address and destination address information from the first set of packets, and a queue manager configured to monitor a condition of the packet memory and generate packet transmission information based on the look-up table, and transmit information representing the condition of the packet memory to the at least one port controller.

Exemplary embodiments of the present invention may include generating a packet flow control signal when a first packet number is greater than a second packet number, and generating a pseudo packet to prevent packets from being transmitted if the first packet number is greater than the second packet number.

BRIEF DESCRIPTION OF THE DRAWINGS

Exemplary embodiments of the present invention will become more apparent by describing in detail exemplary embodiments thereof with reference to the attached drawings in which.

DETAILED DESCRIPTION OF EXEMPLARY EMBODIMENTS OF THE INVENTION

Exemplary embodiments of the present invention will now be described more fully with reference to the accompanying drawings, in which exemplary embodiments of the invention are shown.

Figure 1:
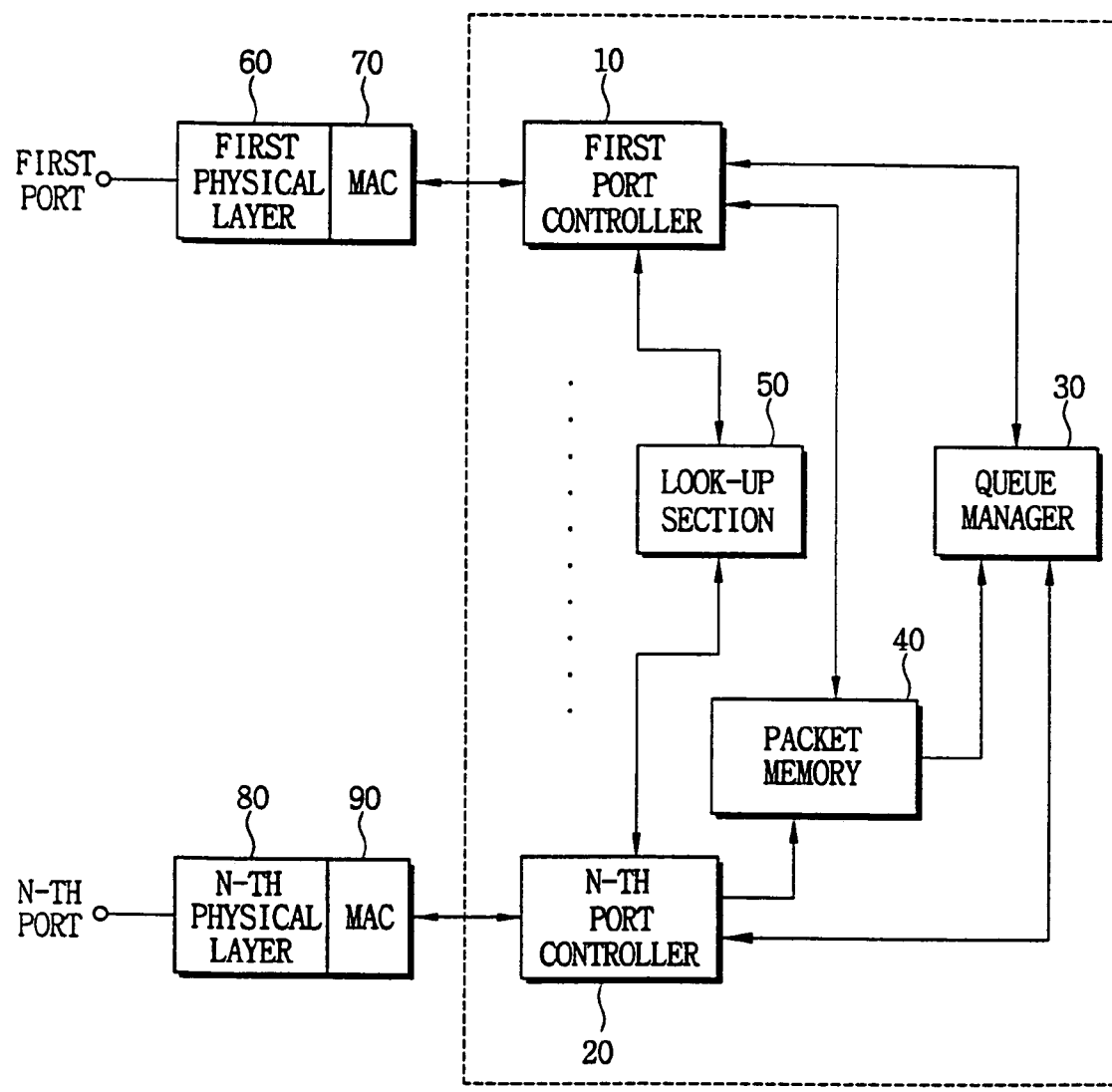
FIG. 1 is a functional block diagram illustrating an apparatus for controlling a bandwidth according to an exemplary embodiment of the present invention.

According to an exemplary embodiment of the present invention, FIG. 1 illustrates an apparatus for controlling bandwidth according to an exemplary embodiment of the invention.

Referring to FIG. 1, the apparatus for controlling the bandwidth includes port controllers 10 and 20, a queue manager 30, a packet memory 40 and a look-up section 50, according to an exemplary embodiment of the present invention. The bandwidth controller further includes physical layers 60 and 80, and respective medium access controllers (MACs) 70 and 90.

According to an exemplary embodiment of the present invention, a first port receives a first set of packets transmitted from an Nth (N is an integer no less than 2) port, and the Nth port receives a second set of packets transmitted from the first port, for example, when the apparatus for controlling the bandwidth is an Ethernet switch, and data may be transmitted from a first station (or source station) to a second station (or destination station). Generally, Ethernet uses carrier sense multiple access with collision detection (hereinafter, referred to as "CSMA/CD") method. In CSMA/CD, collisions between a plurality of message signals occurs when the message signals generated from a plurality of stations are transmitted simultaneously to one station. CSMA/CD will detect this collision and a re-transmission will occur after an arbitrarily predetermined duration of time. The bandwidths most commonly associated with the Ethernet standard include 10 Mbp, 100 Mbps and 1 Gbps.

Referring to FIG. 1 according to an exemplary embodiment of the present invention, the physical layers 60 and 80 correspond to an Open System Interconnection (OSI) layer 1, and the MACs 70 and 90 correspond to an OSI layer 2. The physical layers 60 and 80 provide a signal conversion operation. For example, the physical layers 60 and 80 may convert an analog signal into a digital signal when the physical layer 60 receives a first set of packets from a source station via one of the N ports illustrated in FIG. 1. The physical layer 60 may also convert a digital signal into an analog signal when a different set of packets are transmitted to a destination station via one of the N ports.

The MAC 70 according to an exemplary embodiment of FIG. 1, may read a first set of data included in a first set of packets transmitted from the Nth port, and may read a second set of data from the packet memory 40 and generate a second set of packets using the second set of data read from the memory, and control a packet flow of the packets (hereafter, referred to as "packet flow") based on a packet flow control signal transmitted from the port controller 10. For example, when the first set of packets are received at the MAC 70 from a source station via one of the N ports, the MAC 70 will then read the first set of data. When the second set of data is transmitted to a destination station via one of the N ports, the MAC 70 will generate the second set of packets using the second set of data read, and then transmit the second set of packets to one of the N ports. Additionally, the MAC 70 may generate a third set of packets, for controlling the packet flow based on the packet flow control signal, and control the packet flow using the third set of packets.

The port controller 10, according to an exemplary embodiment of the present invention, may transmit/receive a set of packets, and control the packet flow. For example, when the port controller 10 receives the first set of packets from the source station, the port controller 10 may accumulate the first set of packets for a specific time i.e. one second, and counts the accumulated first set of packets in units of M (wherein M is an integer no less than 64 bytes) to calculate a first packet number. In addition, the port controller 10 calculates a second packet number corresponding to a bandwidth assigned to the first port, compare the first packet number with the second packet number, and generate a packet flow control signal based on the comparison result.

According to an exemplary embodiment of the present invention the first packet number is counted and recorded in a length count (hereafter, referred to as "LC"). The LC contains information representing a length of the first set of packets. The port controller 10 will accumulate the information representing the length of the first set of packets, and then calculate a packet number. The length of the first set of packets is calculated in units of 64 bytes. For example, when the first set of packets have 128 bytes, the length of the first set of packets is equal to 2, i.e. (128÷64), and when the length of the first set of packets have 640 bytes, the length of the packets is equal to 10, i.e. (640÷64).

The port controller 10, according to an exemplary embodiment of the present invention, sums all the values of an upper set of bits except for a lower 6 bits among all the bits recorded in the LC, where the summed value of bits corresponds to a first packet number. For example, when 11 bits are recorded in the LC, all the values of the upper 5 bits are summed, so the first packet number corresponds to the summed values of the upper 5 bits. The port controller 10 may calculate the first packet number for one second, and then resets the first packet number, for example to '0'. Therefore, the first packet number may then be calculated again after one second.

When a second set of packets are transmitted to a destination station via one of the N ports of FIG. 1, according to an exemplary embodiment of the present invention, the port controller 10 may count the second set of data, included in the second set of packets read from the packet memory 40, in units of M bytes to calculate the first packet number. The port controller 10 compares the first packet number with a second packet number, and generates a packet flow control signal based on the comparison result.

The packet memory 40 according to an exemplary embodiment of the present invention, receives the data included in the packets and stores the received data. For example, when the first set of packets are received from the source station via one of the N ports, the packet memory 40 may receive a first set of data included in the first set of packets from the port controller 10, and store the first set of data into the empty space of the packet memory 40. When the second set of packets are transmitted to the destination station via one of the N ports, the packet memory 40 may provide the second set of data stored in the packet memory 40, and then empty the packet memory 40.

The look-up section 50 according to an exemplary embodiment of the present invention, may receive the first set of packets from the port controller 10, and generate a look-up table using the received first set of packets. The look-up table may include a source address, a destination address and a MAC address of the first set of packets. As a result, a message provided from a source station may be transmitted to a destination station using the look-up table, and the look-up section 50 may transmit the look-up table information to the port controller 10.

The queue manager 30, according to an exemplary embodiment of the present invention, monitors the condition of the packet memory 40, and may transmit information representing the condition of the packet memory 40 to the port controller 10. The queue manager 30 may receive the look-up table information from the port controller 10, and store the look-up table information in a queue memory 520, illustrated in an exemplary embodiment of FIG. 7.

For a first set of packets received from the source station via one of the N ports, the port controller 10, for example, may write the first set of data included in the first set of packets into an empty space of the packet memory 40, according to an exemplary embodiment of the present invention. For a second set of packets transmitted to the destination station via one of the N ports, the port controller 10 may read the second set of data included in the second set of packets from the packet memory 40.

The apparatus for controlling the bandwidth, according to an exemplary embodiment of the present invention, controls the packet flow based on the first packet number and the second packet number calculated in units of M bytes. The apparatus may control the packet flow more effectively than a conventional apparatus without increasing the size of the hardware required.

Figure 2:
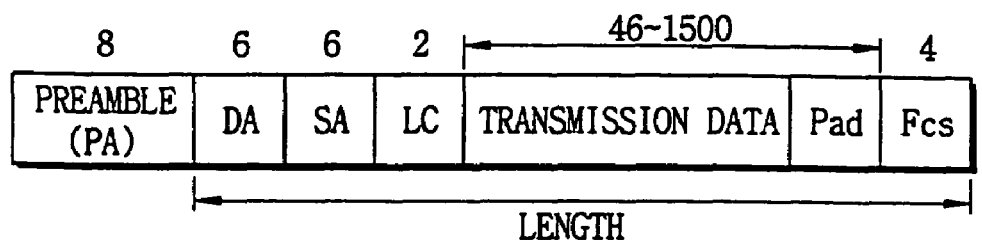
FIG. 2 is a schematic view illustrating MAC packets in accordance with the IEEE 802.3 standard, according to an exemplary embodiment of the present invention.

FIG. 2 is a schematic view illustrating MAC packets according to the IEEE 802.3 standard, and in accordance with an exemplary embodiment of the invention.

Referring to FIG. 2, the packets include a preamble field, a destination address (DA) field, a source address (SA) field, a length count (LC) field, transmission data, a pad field, and a frame check sequence (FCS) field. The length of a packet may be represented by the length of all the fields from the DA to the FCS field. The port controller 10 receives the first set of packets from the MAC 70, of which the preamble field is removed from the packets. For example, the packets may include a type field instead of the LC field, and when the length of a packet is below 64 bytes, the length of the packet is set to 64 bytes using the pad field.

Figure 3:
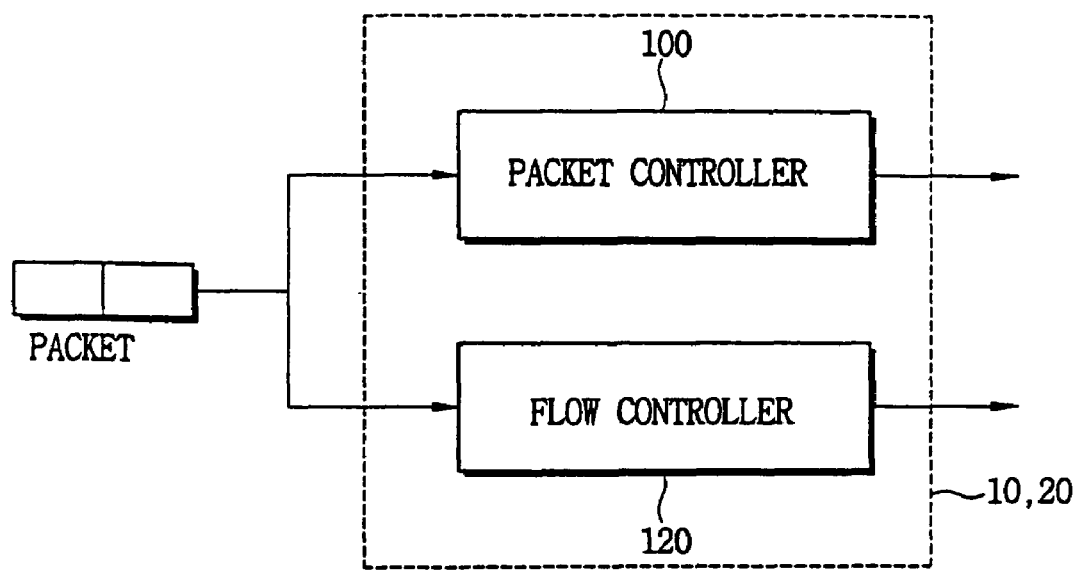
FIG. 3 is a block diagram illustrating a port controller according to an exemplary embodiment of the present invention.

FIG. 3 is a block diagram illustrating a port controller according to an exemplary embodiment of the present invention.

Referring to FIG. 3, the port controller 10 includes a packet controller 100 and a flow controller 120. The packet controller 100 controls the transmission/receipt of the packets. For example, when the first set of packets are received from the source station via one of the N ports, the packet controller 100 may receive the first set of packets from the MAC 70, and write the first set of packets into the packet memory 40, and the look-up section 50. When the second set of packets are transmitted to the destination station via one of the N ports, the packet controller 100 may provide the second set of packets read from the packet memory 40 to the MAC 70.

For a first packet number being greater when compared to a second packet number, the flow controller 120 will generate a packet flow control signal for controlling the packet flow, and will transmit the packet flow control signal to the MAC 70. The MAC 70 controls the packet flow based on the packet flow control signal. The packet flow control may vary depending upon the transmission/receipt of the packets. When the first set of packets are received from the source station via one of the N ports, the MAC 70 generates a pseudo packet for controlling the packet flow. For example, the MAC 70 may generate a pressure packet corresponding to the pseudo packet in a half duplex communication, or generate a pause packet corresponding to the pseudo packet in a full duplex communication. The MAC 70 may transmit the back pressure packet or the pause packet to a station corresponding to the Nth port, thus that station corresponding to the Nth port will stop transmission of a packet.

When the second set of packets is transmitted to the destination station via one of the N ports, the MAC 70 may perform a transmission rate control. For example the MAC 70 may disregard the transmission request to stop transmitting the second set of packets via the N ports.

Figure 4:
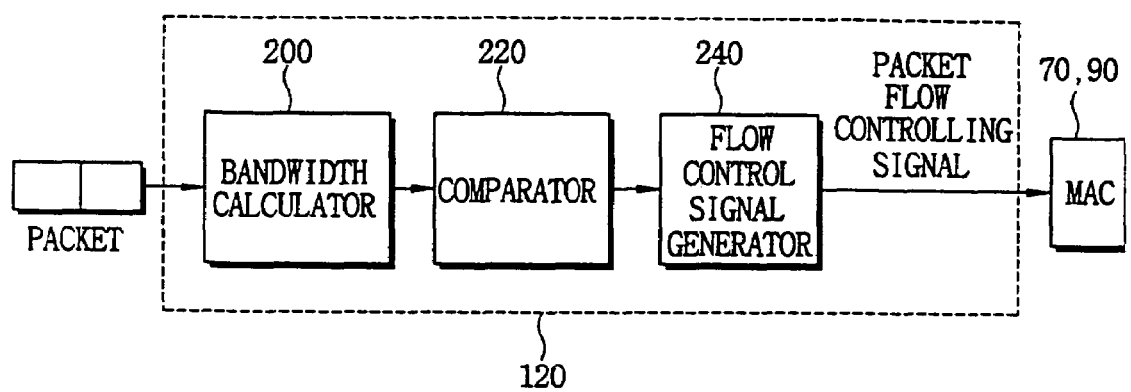
FIG. 4 is a block diagram illustrating a flow controller according to an exemplary embodiment of the present invention.

FIG. 4 is a block diagram illustrating a flow controller according to an exemplary embodiment of the present invention.

Referring to FIG. 4, the flow controller 120 includes a bandwidth calculator 200, a comparator 220 and a flow control signal generator 240, according to an exemplary embodiment of the present invention.

The bandwidth calculator 200, according to an exemplary embodiment of the present invention, calculates the first packet number and the second packet number. For a first set of packets received from a source station via one of the N ports, the received first set of packets are accumulated, and the bandwidth calculator 200 counts the number of the accumulated first set of packets in units of M bytes to calculate the first packet number. Alternatively, when the second set of packets are transmitted to the destination station via one of the N ports, the bandwidth calculator 200 counts the second set of packets, read from the packet memory 40, in units of M bytes to calculate the first packet number. The bandwidth calculator 200 calculates the second packet number corresponding to the second bandwidth assigned to one of the ports. For example, if M is 64 and the specific time interval is 1 second, the bandwidth calculator 200 accumulates the first set of packets for the predetermined time interval, calculates the first packet number, and resets the first packet number to zero.

The bandwidth calculator 200 calculates the length of the packets in units of M (for example, M is greater than or equal to 64 bytes), thus the apparatus for controlling the bandwidth, according to an exemplary embodiment of the present invention may have a reduced hardware size when compared with the conventional bandwidth control apparatus such as an Ethernet switch.

Another example, according to an exemplary embodiment of the present invention provides that the first packet number corresponds to a third packet number summed with a fourth packet number. The third packet number may correspond to a length of a previously accumulated packet, and the fourth packet number may correspond to a length of a present packet. The length of previously accumulated packets may be calculated in units of M bytes, and the length of the present packet may also be calculated in units of M bytes, and to be recorded in the LC.

Another example, according to an exemplary embodiment of the present invention includes a first packet number being equal to (the third packet number)+(the fourth packet number)+(1), when (a first remainder)+(a second remainder) is greater than 64 bytes. The first remainder is referred to as a remainder of (the total bytes of the previously accumulated packets)÷(the length of previously accumulated packets). The second remainder is referred to as a remainder of (the total bytes of the present packet)÷(the length of the present packet). The first and second remainders are expressed in units of bytes, and the second remainder is recorded in the LC. Thus, the second remainder corresponds to the lower six bits among the total bits recorded in the LC.

The second packet number is calculated by a combination of the following equations.

$$\text{Maximum throughput of a packet} = \frac{\text{transmission rate (Mbps)}}{[M \text{ byte } (minpacketsize) + 12 \text{ byte}(IPG) + 8 \text{ byte}(preamble)] \times 8 \text{ bit}} \quad \text{(Equation 1)}$$

where the transmission rate may be 10 Mbps or 100 Mbps, according to an exemplary embodiment of the present invention.

Equation 1 represents a maximum throughput of a packet in an Ethernet switch. The inter-packet gap (IPG) represents the interval between packets. For example, if the minimum packet size M is 64 bytes and the transmission rate is 10 Mbps, the maximum throughput of the packet is 14880, and if M is 64 bytes and the transmission rate is 100 Mbps, the maximum throughput of the packet is 148800. Therefore, a 21-bit counter is required to count 14880 for the transmission rate of 10 Mbps, and a 27-bit counter is required to count 148800 for the transmission rate of 100 Mbps.

$$\text{The second packet number} = \frac{\text{maximumpacket number} \times \text{bandwidthassigned to a port (Mbps)}}{\text{operation mode (Mbps)}} \quad \text{(Equation 2)}$$

The "maximum packet number" of equation 2 represents the maximum throughput of a packet.

The second packet number may have a fixed value irrespective of the operation mode. For example, when the operation mode is 10 Mbps and the assigned bandwidth is 5 Mbps, the second packet number is 7440 (14880×1 2), and when the operation mode is 100 Mbps and the assigned bandwidth is 5 Mbps, the second packet number is 7440 (14880×1 20). Thus, the second packet number may have a constant value irrespective of the mode of operation.

For calculating a second packet number of a corresponding port, a second packet number corresponding to another port may be calculated using a proportional relation irrespective of the operation mode. Thus, when a maximum bandwidth assigned to a port has a specified bandwidth, the hardware configuration of the corresponding Ethernet switch may require less hardware components.

Table 1 represents the second packet number according to an assigned bandwidth.

TABLE 1

| Assigned bandwidth | Packet number | Binary number expression |
|---|---|---|
| 1 Mbps | 1488 | 0_0101110_010000 |
| 2 Mbps | 2976 | 0_1011100_100000 |
| 5 Mbps | 7440 | 0_1110100_010000 |
| 10 Mbps | 14880 | 1_1101000_100000 |

The comparator 220 of FIG. 4 according to an exemplary embodiment of the present invention, compares the first packet number with the second packet number, and provides the comparison result to the flow control signal generator 240.

The flow control signal generator 240 of FIG. 4 according to an exemplary embodiment of the present invention, will generate a packet flow control signal to stop the packet flow control, when the first packet number is greater than the second packet number. The packet flow control signal may then be transmitted to the MAC 70 and 90.

Figure 5:
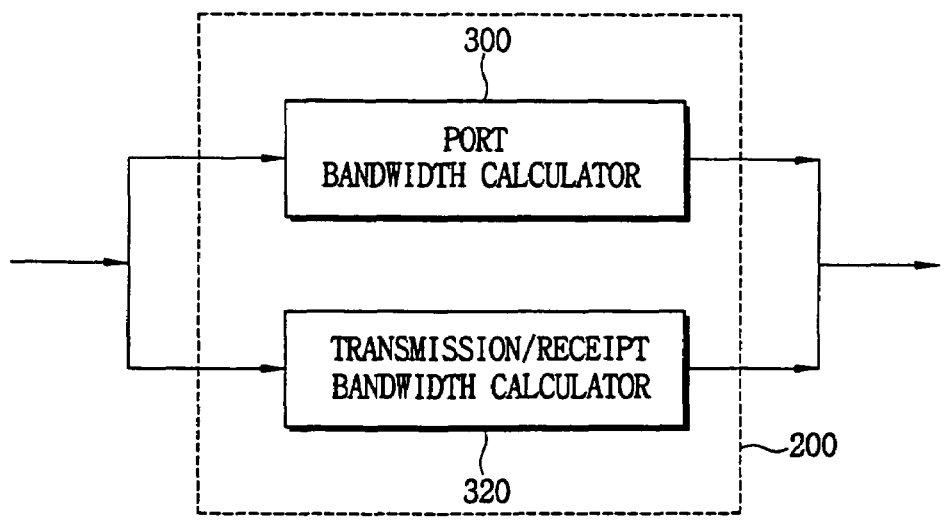
FIG. 5 is a block diagram illustrating a bandwidth calculator according to an exemplary embodiment of the present invention.

FIG. 5 is a block diagram illustrating a bandwidth calculator according to an exemplary embodiment of the present invention.

Referring to FIG. 5, the bandwidth calculator 200 includes a port bandwidth calculator 300, and a transmission/receipt bandwidth calculator 320. The port bandwidth calculator 300 calculates the second packet number corresponding to a bandwidth assigned to each of the ports. The transmission/receipt bandwidth calculator 320 calculates the first packet number when the first set of packets are received from the source station via one of the N ports. The transmission/receipt bandwidth calculator 320 calculates the length of the accumulated packets in units of M bytes to obtain the first packet number. When the second set of packets are transmitted to the destination station via one of the N ports, the transmission/receipt bandwidth calculator 320 calculates the length of the second set of packets read from the packet memory 40 in units of M bytes to obtain the first packet number.

Figure 6:
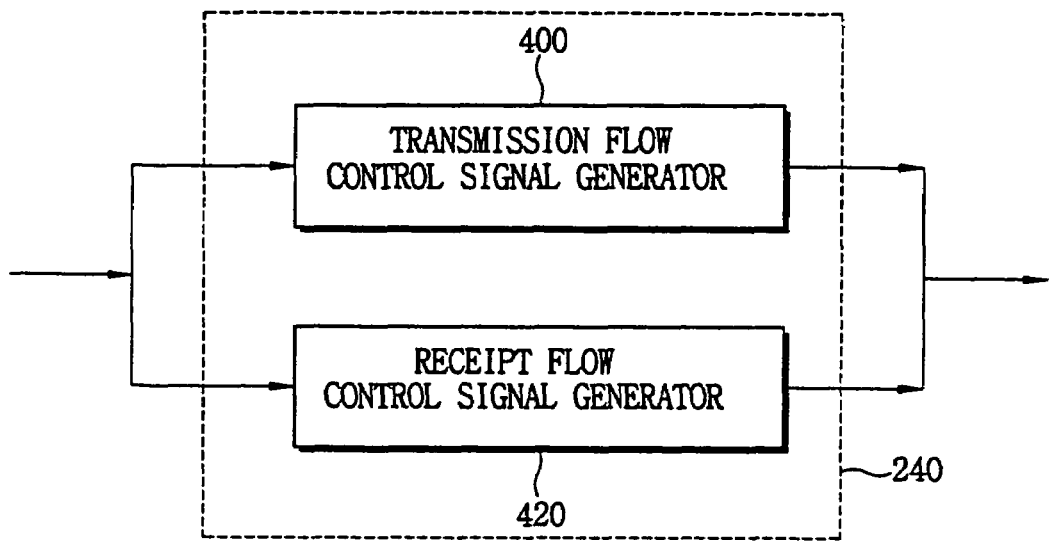
FIG. 6 is a block diagram illustrating a flow control signal generator according to an exemplary embodiment of the present invention.

FIG. 6 is a block diagram illustrating a flow control signal generator according to an exemplary embodiment of the present invention.

Referring to FIG. 6, the flow control signal generator 240 includes a transmission flow control signal generator 400 and a receipt flow control signal generator 420.

When the first packet number is greater than the second packet number, the transmission flow control signal generator 400 generates the packet flow control signal so that the transmission of packets is stopped.

When the first packet number is greater than the second packet number, the receipt flow control signal generator 420 may generate a back pressure packet or a pause packet, and transmit the back pressure packet or the pause packet to other stations, thus preventing the packets from being transmitted from the other stations to the Ethernet switch.

Figure 7:
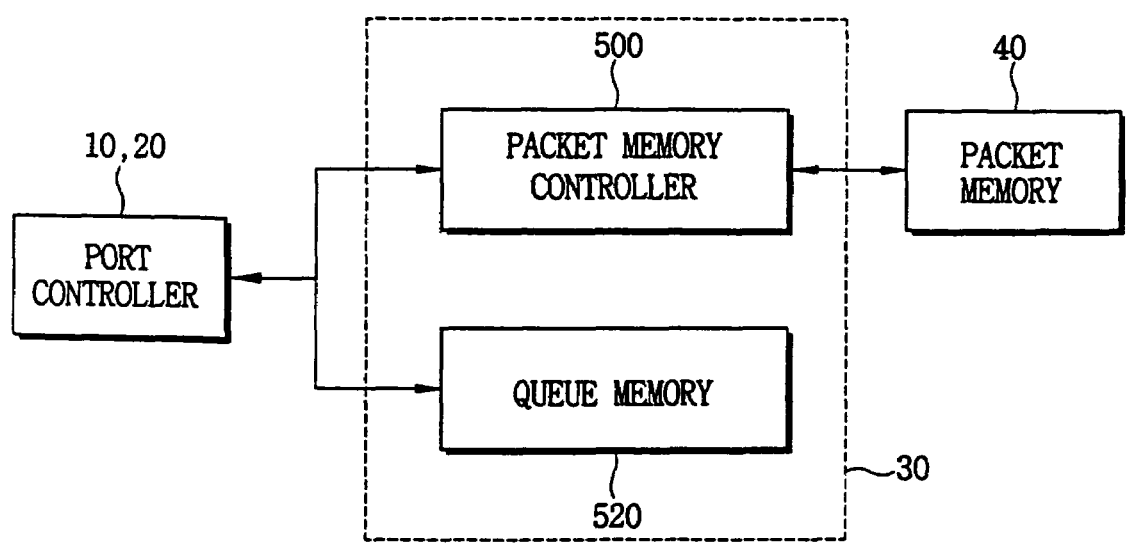
FIG. 7 is a block diagram illustrating a queue manager according to an exemplary embodiment of the present invention.

FIG. 7 is a block diagram illustrating a queue manager according to an exemplary embodiment of the present invention.

Referring to FIG. 7, the queue manager 30 includes a packet memory controller 500 and a queue memory 520.

The packet memory controller 500 monitors the condition of the packet memory 40. For example, the packet memory controller 500 may check whether the packet memory 40 has empty space available. The packet memory controller 500 provides the information representing the condition of the packet memory 40 to the port controllers 10 and 20.

The queue memory 520 stores the look-up table information transmitted from the port controller 10. The queue memory 520 stores packets to be transmitted to each of the ports in different spaces depending upon each of the ports, and generates packet transmission information.

Figure 8:
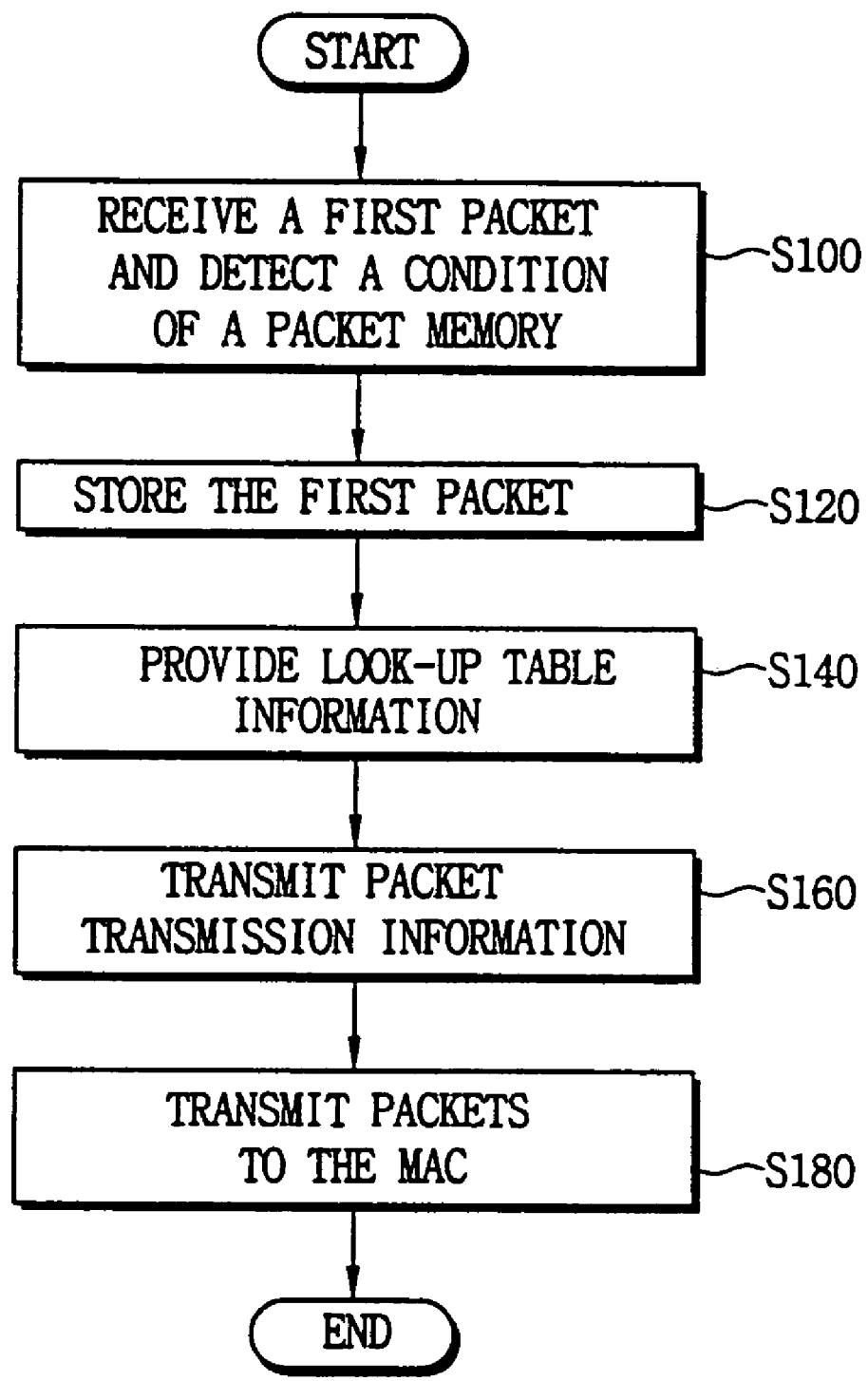
FIG. 8 is a flowchart illustrating transmitting/receiving operations for controlling the bandwidth according to an exemplary embodiment of the present invention.

FIG. 8 is a flowchart illustrating the transmitting/receiving operation of the apparatus for controlling the bandwidth according to an exemplary embodiment of the present invention.

Referring to FIG. 8, in step S100, a first set of packets containing source information and destination information are received, and the condition of the packet memory 40 is detected using information representing the condition of the packet memory 40 transmitted from the queue manager 30.

In step S120, the first set of packets may be stored in an empty space of the packet memory 40 and in the look-up section 50. In step S140, the look-up section 50 generates the look-up table using the source information and the destination information, and provides the look-up table information to one of the port controllers 10 and 20. Therefore, the apparatus for controlling the packet flow may accurately transmit the first set of packets to a destination port using the look-up table information. In step S160, the look-up table information is provided to the queue manager 30. The queue manager 30 transmits the packet transmission information, and information representing the condition of the packet memory 40 to a port controller 10, for example, using the look-up table information. In step S180, the port controller 10 reads the packets from the packet memory 40, and then transmits the read packets to the MAC 70 based on the look-up table information, the packet transmission information and the information representing the condition of the packet memory 40.

Figure 9:
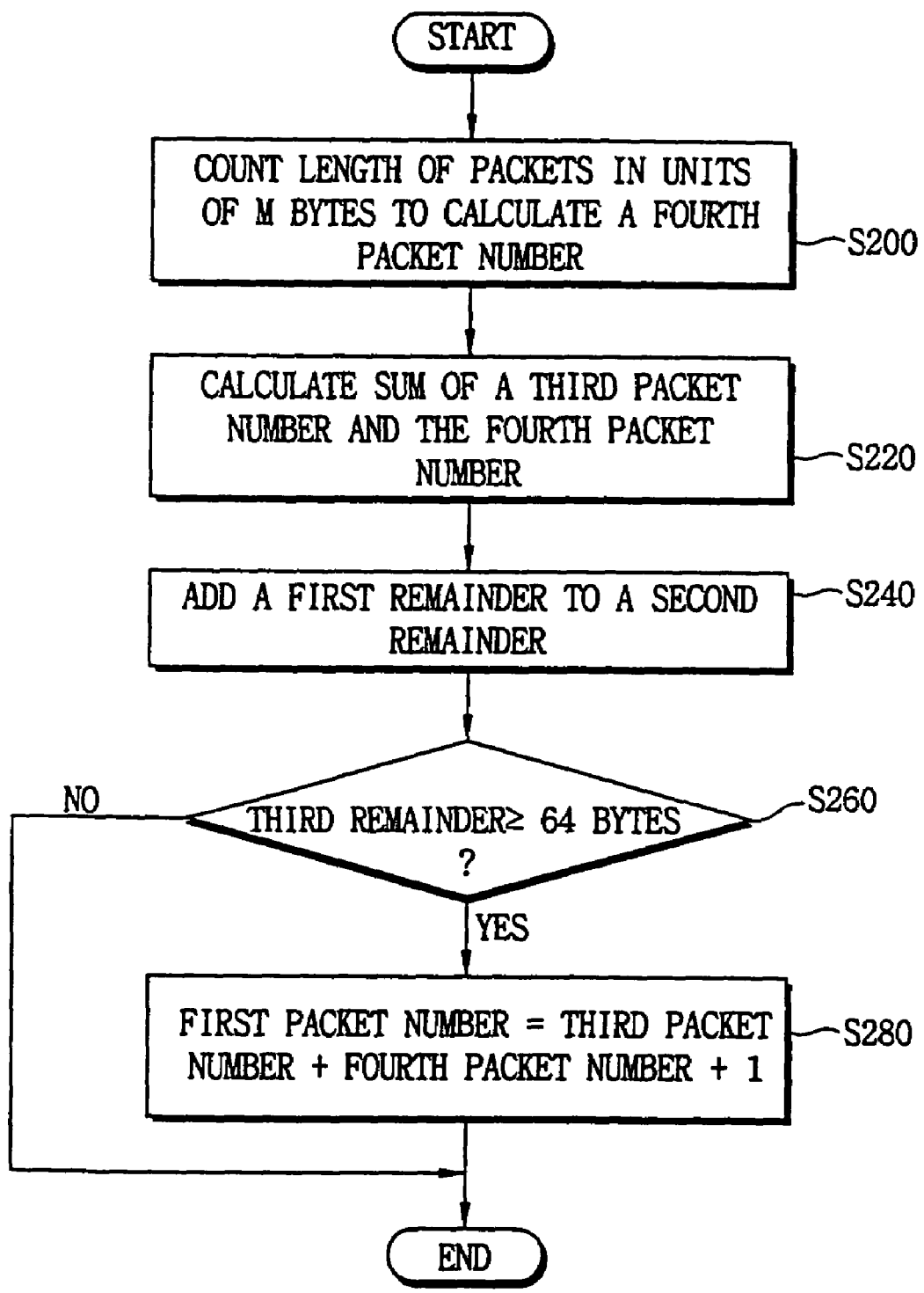
FIG. 9 is a flowchart illustrating a process of calculating a first packet number according to an exemplary embodiment of the present invention.

FIG. 9 is a flowchart illustrating the process of calculating a first packet number according to an exemplary embodiment of the present invention.

Referring to FIG. 9, in step S200, the length of the received (or read) packets is counted in units of M bytes so that a fourth packet number may be calculated. The length of the received, or read, packets corresponds to the fourth packet number. For example, if M is 64, a minimum length of the packets in the Ethernet switch may be 64 bytes. In step S220, the sum of the third packet number and the fourth packet number is calculated. The third packet number may correspond to the length of previously accumulated packets, and the fourth packet number may correspond to the length of present packets, i.e. received, or read, packets. In step S240, a first and second remainder are summed together to obtain a third remainder. The first remainder is referred to as a remainder of (the total bytes of the previously accumulated packets)÷(the length of previously accumulated packets). The second remainder is referred as a remainder of (the total bytes of the present packet)÷(the length of the present packet). In step S260, it is determined whether the third remainder is greater than or less than 64 bytes. In step S280, if the third remainder is determined to be greater than 64 bytes, a first packet number is defined as (the third packet number)+(the fourth packet number)+(1), and when the third remainder is not greater than 64 bytes, the first packet number is defined as (the third packet number)+(the fourth packet number).

Figure 10:
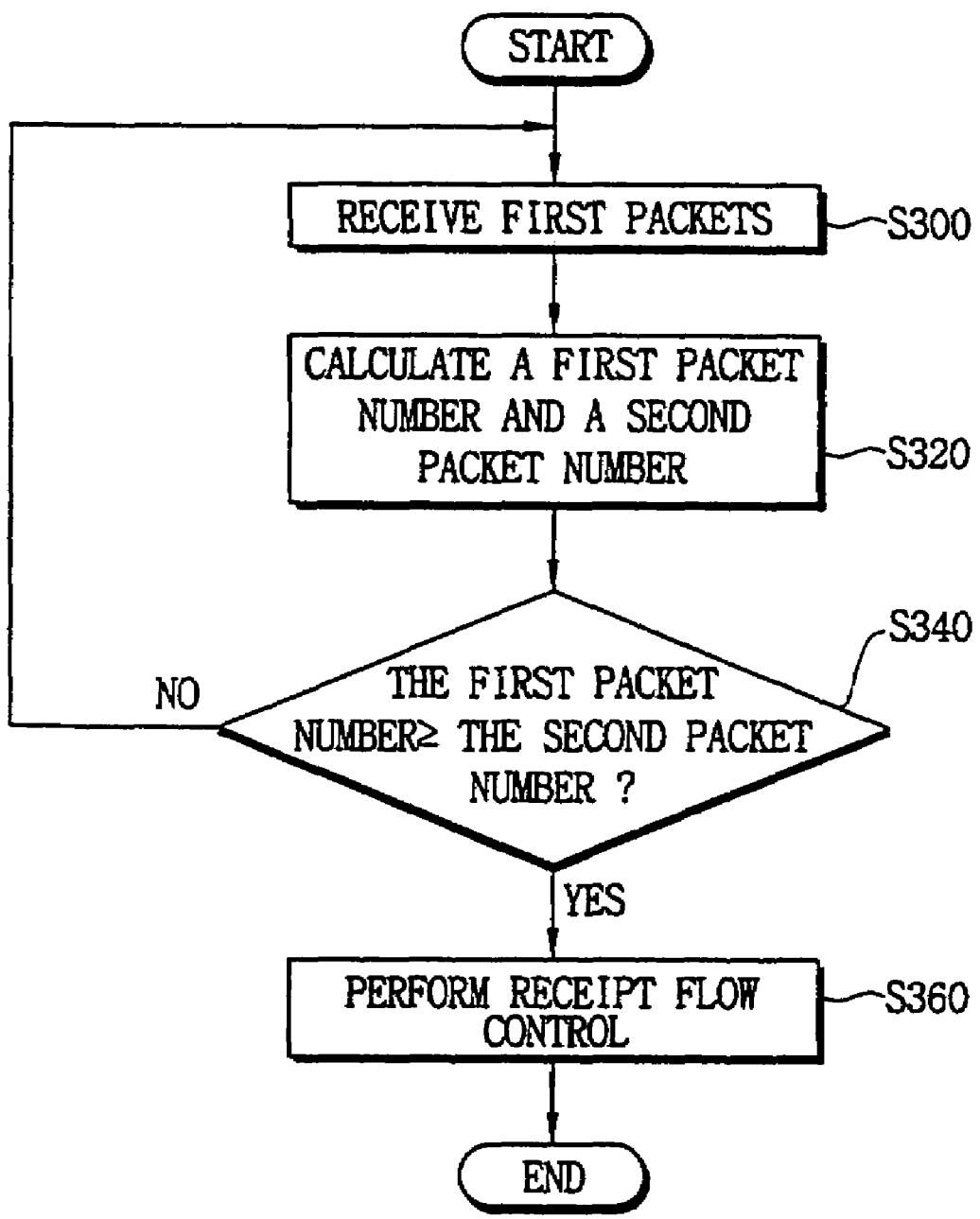
FIG. 10 is a flowchart illustrating a method of controlling a packet flow for packets received from a source station according to an exemplary embodiment of the present invention.

FIG. 10 is a flowchart illustrating a method of controlling a packet flow when a first set of packets are received from a source station via one of the N ports according to one exemplary embodiment of the invention.

Referring to FIG. 10, in step S300, the first set of packets are received from the source station via one of the N ports. In step S320, the bandwidth calculator 200 calculates the length of the accumulated first set of packets in units of M bytes to obtain a first packet number, and calculates the length of the second bandwidth assigned to one of the N ports in units of M bytes to obtain a second packet number. In step S340, the first packet number is compared to the second packet number. In step S360, if the first packet number is greater than the second packet number, then receipt flow control is performed, and if the first packet number is not greater than the second packet number, then step S300 is repeated. The steps may be repeated for a specified amount of time, for example, S300 through S360 may be repeated for a specified amount of time and then the packet number is reset.

The MAC 70, as illustrated in an exemplary embodiment of the present invention, may generate a specific pseudo packet for receipt flow control. For example, the specific packet may be a back pressure packet in a half duplex communication, and the specific packet may be a pause packet in a full duplex communication. In the half duplex communication, data is transmitted in one direction and the back pressure packet is transmitted to another station via one of the N ports. The back pressure packet may be used for creating an idle period of time in a packet transmission, thus stopping the transmission of a first set of packets. As a result, the other station recognizes that a packet collision has occurred, and the other station will stop transmitting packets. In full duplex communication, data may be simultaneously transmitted in both directions, and the pause packet is transmitted to the another station via one of the N ports. As a result, the other station receives the pause packet and will stop the transmission of the first set of packets.

Figure 11:
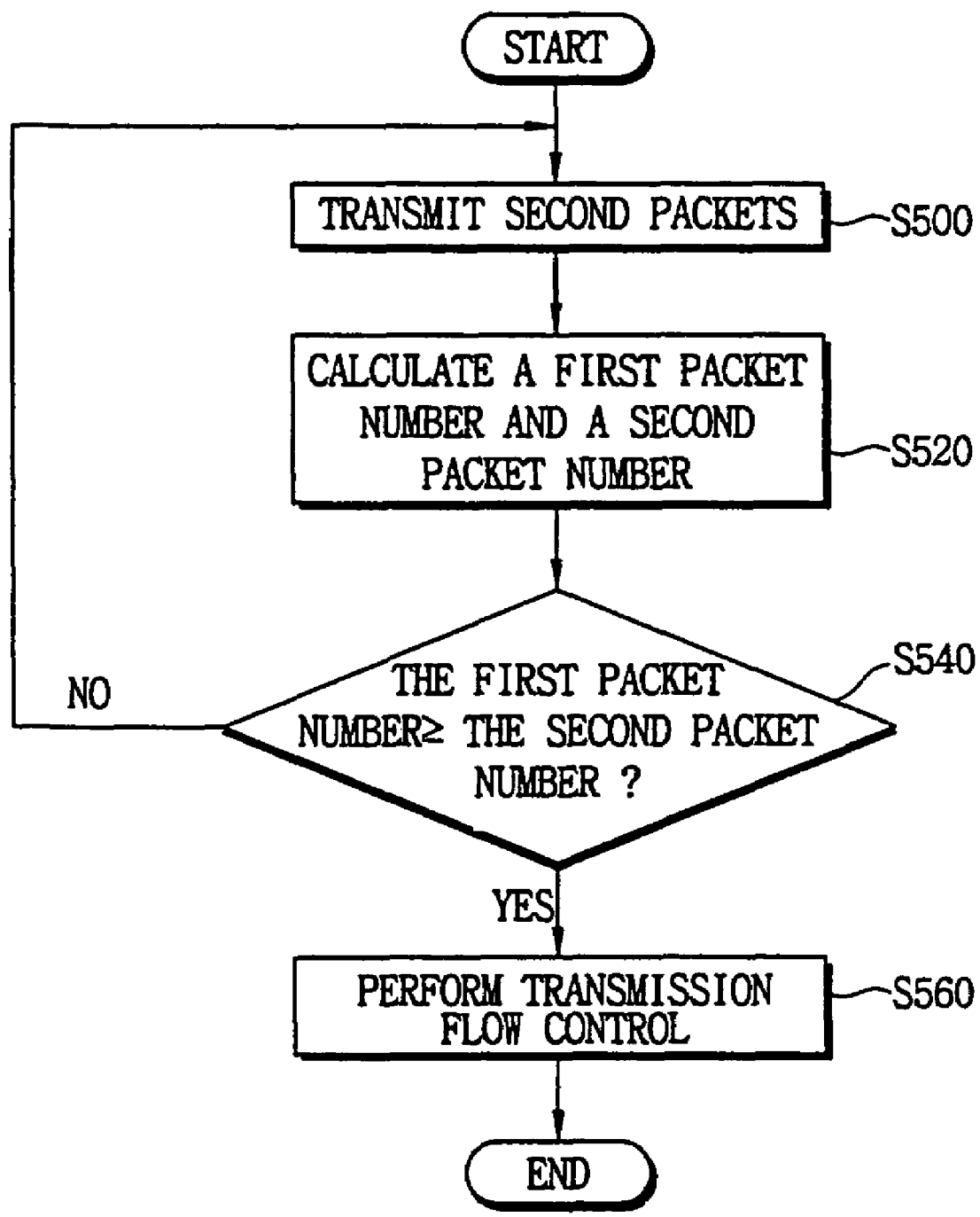
FIG. 11 is a flowchart illustrating a method of controlling a packet flow for packets transmitted to a destination station via one of the N ports according to an exemplary embodiment of the invention.

FIG. 11 is a flowchart illustrating a method of controlling a packet flow when a second set of packets are transmitted to a destination station via one of the N ports, according to an exemplary embodiment of the present invention.

Referring to FIG. 11, in step S500, the port controllers 10 and 20 read a second set of packets from the packet memory 40, and transmit the second set of packets to a destination station. In step S520, the bandwidth calculator 200 calculates the length of the second set of packets in units of M bytes to obtain a first packet number, and calculates the length of a second bandwidth assigned to one of the N ports in units of the M bytes to obtain the second packet number. In step S540, the first packet number is compared with the second packet number. In step S560, if the first packet number is greater than the second packet number, then transmission flow control is performed, and if the first packet number is not greater than the second packet number, then step S500 is performed again. The steps from S500 through S560 are repeated for a constant amount of time, and then the first packet numbers is reset to zero.

The transmission flow control, according to an exemplary embodiment of the present invention, is the transmission rate control. When a first packet number is greater than a second packet number, a packet flow control signal is generated. In the transmission flow control, the MACs 70 and 90 may disregard the transmission request and the transmission of packets may be stopped, thus the bandwidth of the corresponding port will be limited to the assigned bandwidth.

As described above in the exemplary embodiments, the apparatus for controlling the bandwidth compares a first packet number with a second packet number and performs a packet flow control, which controls the bandwidth of the ports. In addition, because the apparatus for controlling the bandwidth calculates the packet numbers of the packets in units of 64 bytes, the hardware size of the corresponding device may be reduced.

The apparatus for controlling the bandwidth may use a table, which includes a packet number corresponding to a bandwidth assigned to one port, thus other packet numbers corresponding to bandwidths assigned to other ports may be calculated using the table. Therefore the calculation of bandwidth assigned to ports may be simplified.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a packet flow in accordance with bandwidths of a corresponding plurality of ports comprising:
   accumulating packets transmitted from a first port of the plurality of ports for a specific time interval;
   counting a length of the accumulated packets in units of M, M being an integer bytes M≧64, for calculating a first packet number, the first packet number being—a second packet number+a third packet number—, the second packet number corresponding to a length of previously accumulated packets, and the third packet number corresponding to a length of a present packet;
   calculating a fourth packet number corresponding to a first bandwidth assigned to a second port;
   comparing the first packet number with the fourth packet number; and
   generating a packet flow control signal based on the comparison result.

2. The method of claim 1, further comprising:
   monitoring a condition of a packet memory;
   generating information representing the condition of the packet memory; and
   storing the packets transmitted in the packet memory using the information representing the condition of the packet memory.

3. The method of claim 1, further comprising: generating a look-up table using the transmitted packets.

4. The method of claim 3, wherein the look-up table includes at least one source address, destination address and medium access control (MAC) address.

5. The method of claim 1, wherein the fourth packet number corresponding to the first bandwidth of a second port is proportional to at least one other packet number corresponding to a second bandwidth assigned to the first port.

6. The method of claim 5, wherein the fourth packet number has a binary value.

7. The method of claim 1, wherein M is 64 bytes.

8. The method of claim 1, wherein the first packet number is—the second packet number+the third packet number+1—when—a first remainder+a second remainder—is greater than 64 bytes, where the first remainder corresponds to a remainder of—total bytes of the previously accumulated packets÷the length of previously accumulated packets—, and the second remainder corresponds to a remainder of—total bytes of the present packet÷the length of the present packet—, and where the first and second remainders are expressed in units of bytes.

9. The method of claim 1, further comprising converting an analog signal corresponding to the packets into a digital signal.

10. The method of claim 1, wherein the packet flow control signal controls the flow of packets.

11. The method of claim 10, wherein the packet flow control signal corresponds to a back pressure packet for a half duplex communication.

12. The method of claim 11, wherein the packet flow control signal corresponds to a pause packet for a full duplex communication.

13. A method of controlling a packet flow in accordance with bandwidths of a corresponding plurality of ports comprising:
   generating a look-up table based on packets received from a first port of the plurality of ports;
   monitoring a condition of a packet memory;
   generating packet transmission information based on information in the look-up table;
   generating information representing the condition of the packet memory;
   reading packets from the packet memory using the look-up table information, the packet transmission information and the information representing the condition of the packet memory;
   counting a length of the packets read in units of M bytes to calculate a first packet number, M being an integer≧64 bytes, the first packet number being—a second packet number+a third packet number—, the second packet number corresponding to a length of previously accumulated packets, and the third packet number corresponding to a length of a present packet;
   calculating a fourth packet number corresponding to a bandwidth assigned to a second port;
   comparing the first packet number with the fourth packet number; and generating a packet flow control signal based on the comparison result.

14. The method of claim 13, wherein the look-up table includes at least one source address, destination address and medium access control (MAC) address.

15. The method of claim 13, wherein the fourth packet number corresponding to the bandwidth of the second port is proportional to at least an other packet number corresponding to another bandwidth assigned to the first port.

16. The method of claim 15, wherein the fourth packet number has a binary value.

17. The method of claim 14, wherein M is 64.

18. The method of claim 17, wherein the first packet number is—the second packet number+the third packet number+1—, when—a first remainder+a second remainder—is greater than 64 bytes, the first remainder corresponds to a remainder of—total bytes of the previously accumulated packets÷the length of previously accumulated packets—, and the second remainder corresponds to a remainder of—total bytes of a present packet÷the length of the present packet—, and the first and second remainders are expressed in a unit of bytes.

19. The method of claim 13, further comprising: converting a digital signal, corresponding to the packets read, into an analog signal.

20. The method of claim 13, wherein the packet flow is controlled based on a transmission rate control.

21. An apparatus for controlling a packet flow in accordance with bandwidths of a corresponding plurality of ports, the apparatus comprising:
a plurality of port controllers configured to receive a first set of packets and compare a first packet number with a second packet number and generate a packet flow control signal based on the comparison result, where the first packet number is calculated in units of M bytes, M being an integer≧64 bytes, the first packet number being—a third packet number+a fourth packet number—, the third packet number corresponding to a length of previously accumulated packets, and the fourth packet number corresponding to a length of a present packet;
a packet memory configured to store the first set of packets;
a look-up section configured to receive the first set of packets from the plurality of port controllers and generate a look-up table containing at least one source address and destination address from the first set of packets; and
a queue manager that is configured to monitor a condition of the packet memory and generate packet transmission information based on the look-up table, and transmit information representing the condition of the packet memory to port controllers.

22. The apparatus of claim 21, wherein at least one of said plurality of port controllers write the first set of packets in the packet memory, and read the second set of packets from the packet memory.

23. The apparatus of claim 21, wherein M is 64 bytes.

24. The apparatus of claim 23, wherein the first packet number is—the third packet number+the fourth packet number+1—, when—a first remainder+a second remainder—is greater than 64 bytes, the first remainder corresponds to a remainder of—total bytes of the previously accumulated packets÷the length of previously accumulated packets—, and the second remainder corresponds to a remainder of—total bytes of the present packet÷the length of the present packet—, where the first and second remainders are expressed in a unit of bytes.

25. The apparatus of claim 21, wherein the port controllers include:
a packet controller configured to transmit the second set of packets, and configured to receive the first set of packets; and
a flow controller that is configured to control the packet flow of the first and second set of packets.

26. The apparatus of claim 25, wherein the flow controller includes:
a bandwidth calculator configured to calculate the first packet number and the second packet number;
a comparator configured to compare the first packet number with the second packet number; and
a flow control signal generator configured to generate the packet flow control signal.

27. The apparatus of claim 26, wherein the bandwidth calculator includes:
a transmission/receipt bandwidth calculator that is configured to calculate the first packet number; and
a port bandwidth calculator that is configured to calculate the second packet number.

28. The apparatus of claim 26, wherein the flow control signal generator includes:
a receipt flow control signal generator configured to generate the packet flow control signal corresponding to the first set of packets; and
a transmission flow control signal generator configured to generate the packet flow control signal corresponding to the second set of packets.

29. The apparatus of claim 21, wherein the queue manager includes:
a packet memory controller configured to monitor the packet memory, and control the condition of the packet memory; and
a queue memory configured to generate the packet transmission information based on the look-up table.

30. The apparatus of claim 21, further comprising:
a physical layer which receives the first and second sets of packets, and converts a signal corresponding to the first set of packets into a digital signal, and converts another signal corresponding to the second set of packets into an analog signal; and
a medium access control (MAC) which transmits the digital signal to at least one of the port controllers, and controls the packet flow of the first and second set of packets.

31. The apparatus of claim 30, wherein the packet flow control signal is generated and a transmission rate control is performed when the second set of packets are provided from the packet memory.

32. The apparatus of claim 31, wherein the packet flow control signal corresponds to a back pressure packet for a half duplex communication.

33. The apparatus of claim 32, wherein the packet flow control signal corresponds to a pause packet for a full duplex communication.

34. The apparatus of claim 21, wherein the plurality of ports correspond to the plurality of port controllers.

35. The apparatus of claim 34, wherein the plurality of ports have at least one assigned bandwidth.

36. An Ethernet switch comprising:
a plurality of port controllers configured to receive a first set of packets and compare a first packet number with a second packet number, and generate a packet flow control signal based on the comparison result, where the first packet number is calculated in units of M bytes, M being an integer≧64 bytes, the first packet number being—a third packet number+a fourth packet number—, the third packet number corresponding to a length of previously accumulated packets, and the fourth packet number corresponding to a length of a present packet;
a packet memory that is configured to store the first set of packets;
a look-up section that is configured to receive the first set of packets from the plurality of port controllers, and generate a look-up table containing at least one source address, destination address, and medium access control (MAC) address information based on the first set of packets; and
a queue manager configured to monitor a condition of the packet memory, and generate packet transmission information based on the look-up table, and transmit information representing the condition of the packet memory to at least one of said plurality of port controllers.

37. The Ethernet switch of claim 36, wherein the plurality of port controllers are configured to write the first set of packets in the packet memory, and read the second set of packets from the packet memory.

38. The Ethernet switch of claim 37, wherein the plurality of ports correspond to the plurality of port controllers.

39. The Ethernet switch of claim 36, wherein M is 64 bytes.

40. The Ethernet switch of claim 36, wherein the second packet number is proportional to at least another second packet number of another of the plurality of ports.

41. The Ethernet switch of claim 40, wherein the second packet number has a binary value.

42. A flow controller comprising:
a bandwidth calculator configured to count at least one set of packets and calculate at least a first packet number, the first packet number being—a second packet number+a third packet number—, the second packet number corresponding to a length of previously accumulated packets, and the third packet number corresponding to a length of a present packet;
a comparator configured to compare the first packet number with a fourth packet number; and
a flow control signal generator which receives the comparison result of the comparator and generates a packet flow control signal corresponding to the comparison result.

43. A method for controlling a flow of data comprising:
counting at least one set of packets received;
calculating a first packet number from the at least one set of packets counted, the first packet number being—a second packet number+a third packet number—, the second packet number corresponding to a length of previously accumulated packets, and the third packet number corresponding to a length of a present packet;
comparing the first packet number to a fourth packet number; and
generating a packet flow control signal corresponding to the comparison result.

44. A bandwidth calculator comprising:
a transmission receipt bandwidth calculator, which calculates a first packet number corresponding to a length of a set of packets, the first packet number being—a second packet number+a third packet number—, the second packet number corresponding to a length of previously accumulated packets, and the third packet number corresponding to a length of a present packet; and
a port bandwidth calculator, which calculates a fourth packet number corresponding to a bandwidth assigned to at least one port.

45. The bandwidth calculator of claim 44, further comprising:
at least one port controller configured to receive a first set of packets and compare the first packet number with the fourth packet number and generate a packet flow control signal based on the comparison result, where the first packet number is calculated in units of M bytes, M being an integer $\geq 64$ bytes.

46. The bandwidth calculator of claim 45, wherein the at least one port controller includes,
a comparator configured to compare the first packet number with the fourth packet number, and
a flow control signal generator configured to generate a packet flow control signal.

47. The bandwidth calculator of claim 45, further comprising:
a packet memory configured to store the set of packets; and
a look-up section that is configured to receive the set of packets from the at least one port controller and generate a look-up table containing at least one source address and destination address from the set of packets; and a queue manager configured to monitor a condition of the packet memory and generate packet transmission information based on the look-up table, and transmit information representing the condition of the packet memory to the at least one port controller.

48. A flow control signal generator comprising:
a transmission flow control signal generator, which generates a packet flow control signal when a first packet number is greater than a second packet number, the first packet number being—a third packet number+a fourth packet number—, the third packet number corresponding to a length of previously accumulated packets, and the fourth packet number corresponding to a length of a present packet; and
a receipt flow control signal generator, which generates a pseudo packet to prevent packets from being transmitted if the first packet number is greater than the second packet number.

49. The flow control signal generator of claim 48, including a bandwidth calculator further comprising:
a transmission receipt bandwidth calculator, which calculates a first packet number corresponding to a length of a set of packets; and
a port bandwidth calculator, which calculates a second packet number corresponding to a bandwidth assigned to at least one port.

50. The flow control signal generator of claim 49, further comprising:
at least one port controller configured to receive a first set of packets and compare the first packet number with the second packet number and generate a packet flow control signal based on the comparison result, where the first packet number is calculated in units of M bytes, M being an integer, and $M \geq 64$.

51. The flow control signal generator of claim 50, wherein the at least one port controller includes,
a comparator configured to compare the first packet number with the second packet number, and
a flow control signal generator configured to generate a packet flow control signal.

52. The flow control signal generator of claim 49, further comprising:
a packet memory configured to store the first set of packets; and
a look-up section that is configured to receive the first set of packets from the at least one port controller and generate a look-up table containing source address and destination address information from the first set of packets; and
a queue manager configured to monitor a condition of the packet memory and generate packet transmission information based on the look-up table, and transmit information representing the condition of the packet memory to the at least one port controller.

53. A method for controlling a flow control signal generator comprising:
generating a packet flow control signal when a first packet number is greater than a second packet number, the first packet number being—a third packet number+a fourth packet number—, the third packet number corresponding to a length of previously accumulated packets, the fourth packet number corresponding to a length of a present packet; and
generating a pseudo packet to prevent packets from being transmitted from the port if the first packet number is greater than the second packet number.

* * * * *